United States Patent [19]

Dellanno et al.

[11] Patent Number: 5,181,763
[45] Date of Patent: Jan. 26, 1993

[54] APPARATUS FOR PREVENTING WHIPLASH

[75] Inventors: Ronald P. Dellanno, 532 Broad St., Bloomfield, N.J. 07003; Quentin E. Gualtier, North Caldwell, N.J.

[73] Assignee: Ronald P. Dellanno, Bloomfield, N.J.

[21] Appl. No.: 771,827

[22] Filed: Oct. 7, 1991

Related U.S. Application Data

[63] Continuation of Ser. No. 585,392, Sep. 20, 1990, abandoned.

[51] Int. Cl.⁵ .................................................. A47C 7/36
[52] U.S. Cl. .................................... 297/391; 297/404; 297/408; 297/410
[58] Field of Search ............... 297/391, 396, 408, 216, 297/404, 410; 5/434, 439, 440, 436

[56] References Cited

U.S. PATENT DOCUMENTS

| | | | |
|---|---|---|---|
| 276,938 | 12/1984 | Pedersen | 5/434 |
| 2,973,029 | 2/1961 | Schlosstein | 297/216 |
| 2,990,008 | 6/1961 | Bien | 297/397 |
| 3,510,150 | 5/1970 | Wilfert | 280/150 |
| 3,680,912 | 8/1972 | Matsuura | 297/391 |
| 3,706,472 | 12/1972 | Mertens | 297/391 |
| 4,123,104 | 10/1978 | Andres et al. | 297/391 |
| 4,256,341 | 3/1981 | Göldner et al. | 297/408 |
| 4,278,291 | 7/1981 | Asai | 297/391 |
| 4,285,081 | 8/1981 | Price | 297/391 X |
| 4,304,439 | 12/1981 | Terada et al. | 297/409 |
| 4,424,599 | 1/1984 | Hannouche | 5/436 |
| 4,657,304 | 4/1987 | Heesch et al. | 297/391 |
| 4,693,515 | 9/1987 | Russo et al. | 297/391 |
| 4,720,146 | 1/1988 | Mawbey et al. | 297/409 |
| 4,754,513 | 7/1988 | Rinz | 5/434 X |
| 4,778,218 | 10/1988 | Suman | 297/391 |
| 4,829,614 | 5/1989 | Harper | 5/436 |
| 4,832,007 | 5/1989 | Davis, Jr. et al. | 5/436 X |
| 4,865,388 | 9/1989 | Nemoto | 297/403 |

OTHER PUBLICATIONS

Murphy, "Whiplash and Spinal Trauma Notes", dated Jan. 1989, pp. 81-107.
Foreman and Croft, "Whiplash Injuries, The Cervical Acceleration Deceleration Syndrome", Chapter 8, pp. 271-327.
Dellanno, "Whiplash Neck Injuries" brochure, dated 1988.

Primary Examiner—Kenneth J. Dorner
Assistant Examiner—Milton Nelson, Jr.
Attorney, Agent, or Firm—Klauber & Jackson

[57] ABSTRACT

An apparatus for preventing whiplash related injuries has a support member adjustably supported within the seat of a vehicle, and adapted to be moved upwardly or downwardly relative to a passenger in the seat. A frame is supported on the support member and located behind the cranium and cervical spine of the passenger. A layer of resilient material is supported on the frame, and defines a supporting surface. The supporting surface defines a contour that corresponds to the posterior contour of the passenger's cranium and cervical spine. The supporting surface is therefore adapted to simultaneously decelerate the cranium and cervical spine during a vehicle collision and, thus, prevent whiplash related injuries to the passenger.

8 Claims, 5 Drawing Sheets

APPARATUS FOR PREVENTING WHIPLASH

This is a continuation of application Ser. No. 07/585,392, filed on Sep. 20, 1990 and abandoned on Oct. 7, 1991.

FIELD OF THE INVENTION

The present invention relates to apparatus for hygienically supporting a person's cranium and cervical spine including passenger safety apparatus for vehicles and, particularly, apparatus for preventing whiplash related injuries.

BACKGROUND INFORMATION

Whiplash related injuries are caused by the rapid acceleration of a person's cranium and cervical spine, which occurs, for example, in an automobile collision. The rapid acceleration causes the extension and flexion of the cervical spine which, in turn, can cause severe injury. Types of whiplash related injuries include fractured and/or dislocated vertebrae, torn ligaments (both anterior and posterior of the spinal column), and avulsion of parts of the vertebrae, ligaments and intervertebrae discs.

It has been found that the C4, C5 and C6 cervical vertebrae, and the paravertebrae ligaments are most often damaged with whiplash related injuries, although the entire cervical spine may well be involved. Rapid hyperextension of the cervical spine can stretch the anterior longitudinal ligament, thus placing it in traction and causing either bone or ligamentous damage. Such hyperextension typically damages the C1 through C cervical vertebrae. The vertebral artery, which extends through an opening in the vertebrae, and the sympathetic nerve fibers that surround the artery are also often damaged. These types of injuries cause severe disabilities and, in some instances, death.

Seatbacks and/or headrests in automobiles, trucks, and other types of vehicles are provided to prevent whiplash related injuries to passengers during collisions, but typically fail. During a rear-end vehicle collision, the forces of the collision typically cause a passenger's cranium and cervical spine to rapidly accelerate toward the rear of the vehicle. Once the cranium strikes the seatback or headrest, it then rapidly accelerates in the opposite direction toward the front of the vehicle. The rearward acceleration of the cranium, and resulting collision with the seatback or headrest, causes hyperextension of the cervical spine and, thus, typically injures the anterior structure of the passenger's neck. The forward acceleration of the cranium, on the other hand, causes hyperflexion of the cervical spine and typically injures the posterior structure of the neck.

One problem with known seatbacks and/or headrests is that the surface intended to stop the movement of a person's head and neck is typically flat, or does not correspond to the posterior contour thereof. As a result, during a rear-end collision, typically the back, or posterior portion of the cranium is the first portion of the passenger's body to strike the seatback or headrest. However, the cervical spine, which is located inferiorly with respect to the posterior portion of the cranium, continues to move toward the headrest. As a result, the cervical spine is forced to move relative to the cranium which, in turn, causes severe vertebral damage.

Also, the top surfaces of many known headrests are located at about the same height, or below the height of a passenger's ears, which is normally about the center of gravity of the head. When a passenger's cranium is forced against such a headrest during a collision, it often slides upwardly over the top edge of the headrest. As a result, the cranium is stretched upwardly relative to the cervical spine, typically causing further vertebral damage.

It is an object of the present invention, therefore, to overcome the problems and disadvantages of known apparatus for preventing whiplash, such as vehicle headrests and seatbacks.

SUMMARY OF THE INVENTION

The present invention is directed to an apparatus for preventing whiplash related injuries The apparatus comprises a frame adapted to be supported on the seat of a motor vehicle and located behind the cranium and cervical spine of a passenger seated therein. The apparatus further comprises a layer of resilient material supported on the frame. The layer of resilient material defines a supporting surface thereon. The supporting surface is located behind the cranium and cervical spine of the passenger and defines a contour that corresponds to the posterior contour of the passenger's cranium and cervical spine. The supporting surface is therefore adapted to substantially simultaneously decelerate the cranium and cervical spine during a vehicle collision to, in turn, prevent whiplash related injuries to the passenger.

In an apparatus of the present invention, the supporting surface defines a first area adapted to contact and support the approximate central posterior area of the passenger's cranium. A second area is located below the first area, and is adapted to contact and support the posterior area approximately where the passenger's cranium meets the cervical spine. A third area is located below the second area, and is adapted to contact and support the posterior area of the passenger's cervical spine. Thus, the first, second and third areas each contact these respective areas of the passenger's body to substantially simultaneously decelerate the cranium and cervical spine during a vehicle collision.

An apparatus of the present invention further comprises a support member coupled to the frame and supported on the seat. The support member is vertically moveable relative to the seat to adjust the position of the apparatus relative to the passenger. Accordingly, the support member can be adjusted to, in turn, adjust the position of the supporting surface to correspond to the posterior contour of the passenger's cranium and cervical spine. The frame of the apparatus preferably defines a hollow enclosure, and the layer of resilient material consists essentially of a urethane foam molded thereon.

In an apparatus of the present invention, the frame is journaled to the support member, and normally biased toward the front of the seat. Thus, during a vehicle collision, when the passenger's head is forced toward the apparatus, the posterior portion of the passenger's cranium initially contacts the first area of the supporting surface, and causes the frame to rotate relative to the support member toward the back of the seat. Thus, the second and third areas of the supporting surface are, in turn, rotated into contact with the posterior portion of the passenger's lower cranium and cervical spine. The support member of the apparatus preferably includes two support legs and a bar extending therebetween. The two support legs are supported on the seat and oriented substantially parallel relative to each other, and the frame is journaled to the bar.

An apparatus of the present invention further includes a stop member coupled to the bar, and projecting upwardly therefrom. A stop plate is coupled to the frame and adapted to slide relative to the stop member. A spring is coupled between the stop plate and the bar. The spring biases the stop plate to slide relative to the stop member toward the front of the seat and, thus, biases the stop plate and frame toward the passenger's head. The stop plate defines an elongated aperture extending therethrough, and adapted to receive the stop member therein. The elongated aperture permits the stop plate to slide toward the front of the seat until a back wall defining the aperture engages the stop member, thus orienting the apparatus in a downwardly rotated position. The elongated aperture further permits the stop plate t slide toward the rear of the seat until a front wall defining the aperture abuts the stop member and, thus, orients the apparatus in an upright position.

One advantage of the apparatus of the present invention, is that because the supporting surface has a contour that corresponds to the posterior contour of the passenger's cranium and cervical spine, the apparatus can substantially simultaneously decelerate the cranium and cervical spine during a vehicle collision. As a result, whiplash related injuries typically encountered in such collisions are ordinarily avoided.

Other advantages of the apparatus of the present invention will become apparent in view of the following detailed description and drawings taken in connection therewith.

DETAILED DESCRIPTION

Figure 1:
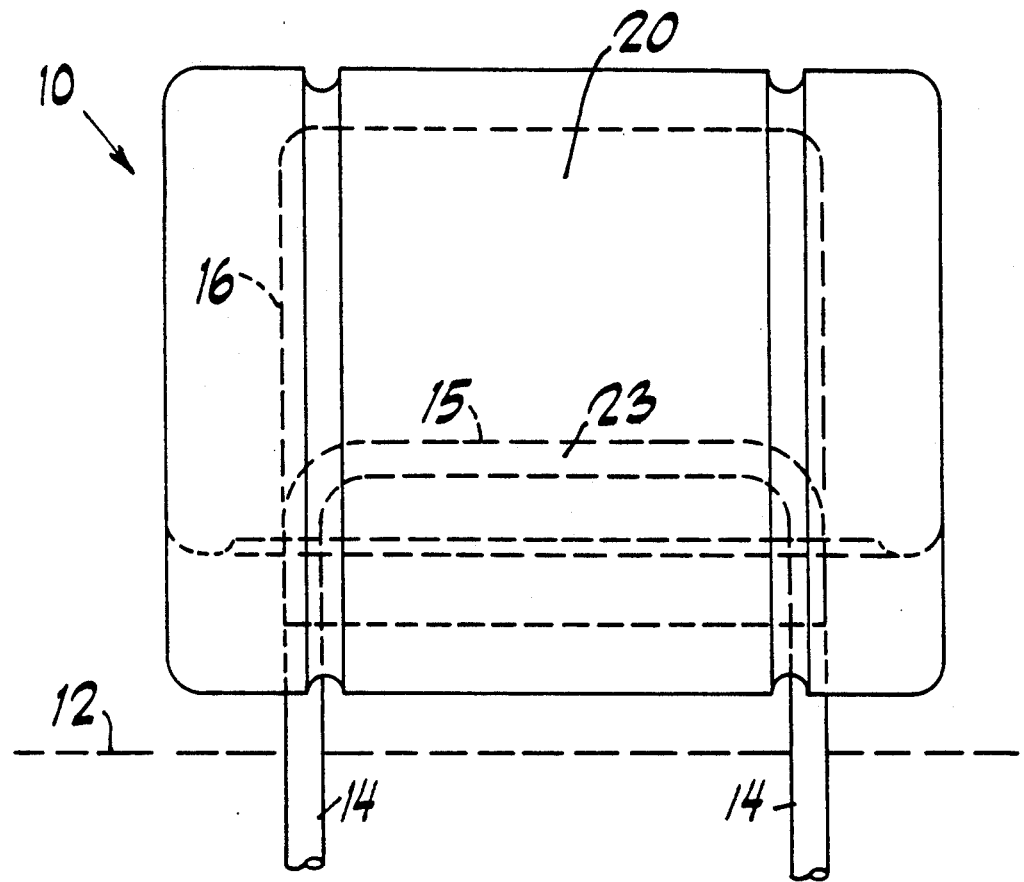
FIG. 1 is a front plan view of an apparatus for preventing whiplash related injuries embodying the present invention.
Figure 2:
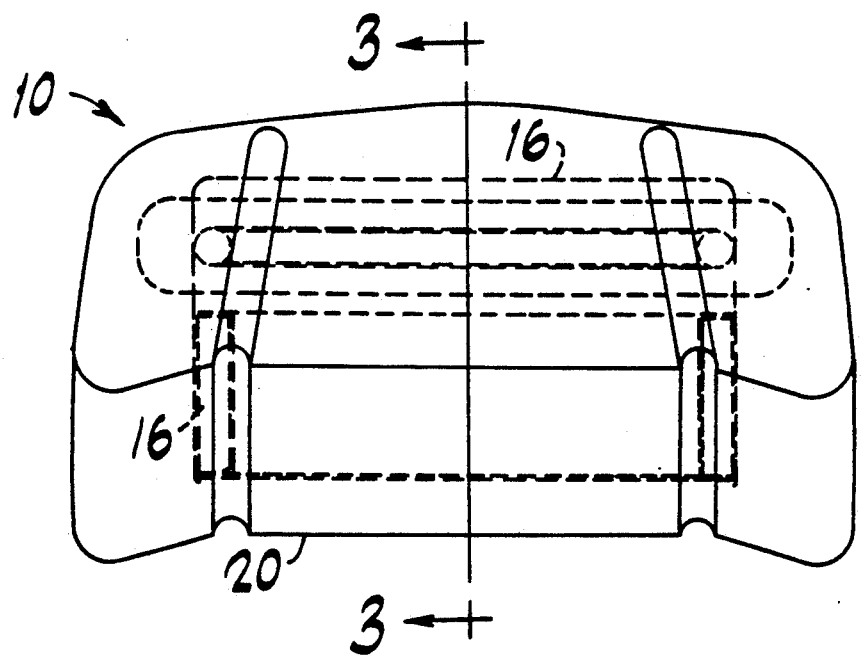
FIG. 2 a top plan view of the apparatus of FIG. 1.
Figure 3:
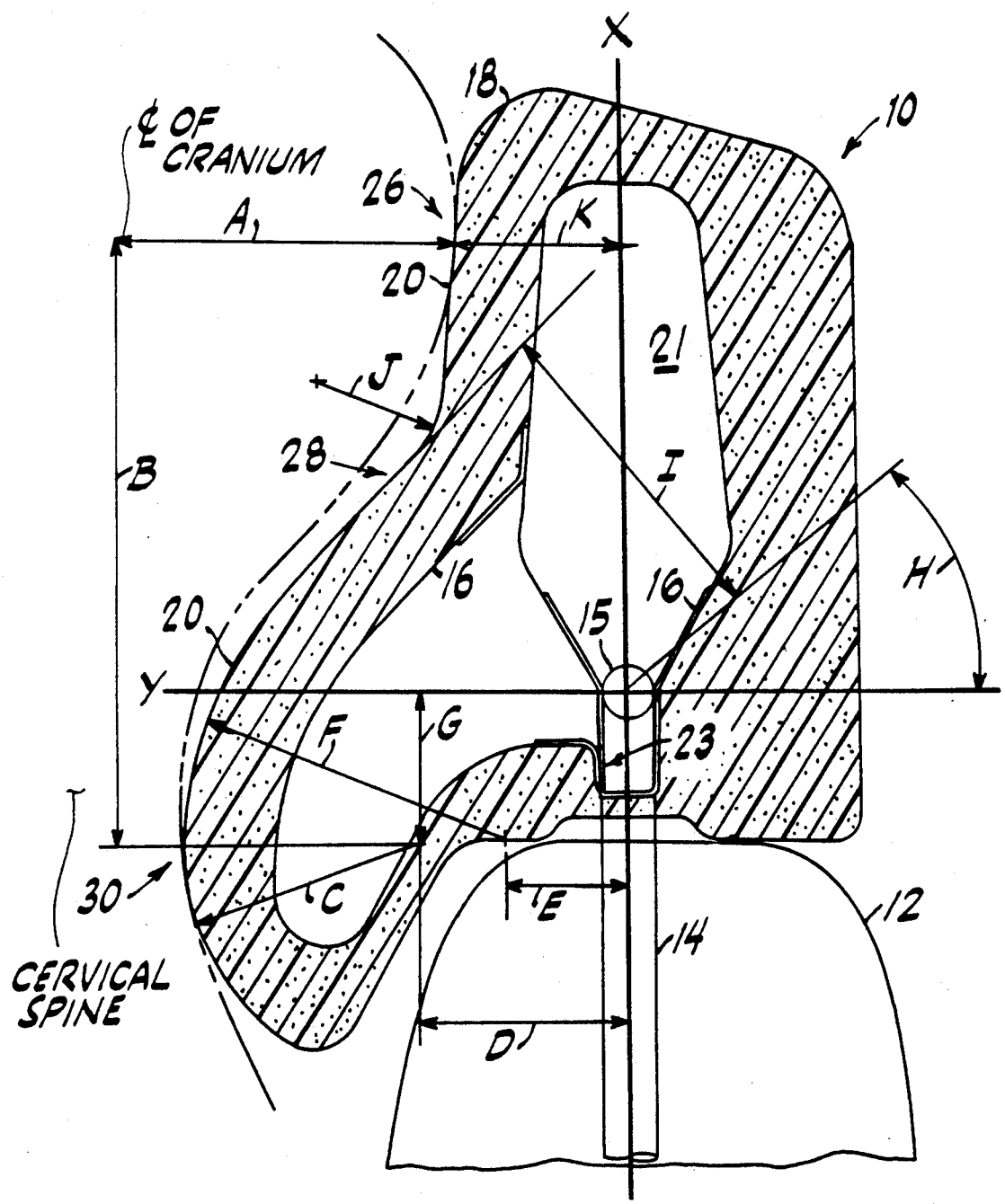
FIG. 3 is a cross-sectional view taken along the line 3—3 of FIG. 2, illustrating the contour of a typical passenger's cranium and cervical spine in broken lines.

In FIGS. 1 through 3 an apparatus embodying the present invention for preventing whiplash related injuries is indicated generally by the reference numeral 10. The apparatus 10 is used as a headrest in a motor vehicle (not shown) and is supported on the top of a seatback 12 (illustrated schematically in dashed lines in FIG. 1). The apparatus 10 is mounted on a support member including two vertical support legs 14 coupled together by a horizontal bar 15. The vertical support legs 14 are supported within the seatback 12, and are adjustable for adjusting the height of the apparatus 10 relative to the seatback 12, in a manner known to those skilled in the art.

The apparatus 10 comprises an inner frame 16 coupled to the horizontal bar 15 and support legs 14. A resilient foam outer layer 18 is molded onto the inner frame 16. The foam layer 18 preferably consists essentially of a urethane foam typically used to make automobile headrests. As shown in FIG. 3, the inner frame 16 and foam layer 18 define a head and neck supporting surface 20 on the front of the apparatus 10.

The posterior contour of a typical passenger's cranium and cervical spine is illustrated in phantom lines in FIG. 3. As can be seen, the supporting surface 20 is shaped to conform to the typical posterior contour. The supporting surface 20 therefore includes three general areas: a first area 26, a second area 28 and a third area 30. As shown in FIG. 3, the first area 26 is located to contact and support the approximate central posterior area of the passenger's cranium; the second area 28 is located to contact and support the posterior area approximately where the cranium meets the cervical spine; and the third area 30 is located to contact and support the posterior area of the cervical spine. Thus, as shown in FIG. 3, because the contour of the surface 20 corresponds to the posterior contour of the cranium and cervical spine, each of the first area 26, second area 28, and third area 30 substantially simultaneously contact and support the respective portions of the passenger's body when moved into contact therewith.

One advantage of the apparatus 10 of the present invention, is that during a rear-end collision, when the passenger is forced toward the seatback 12, the passenger's cranium and cervical spine substantially simultaneously strike the supporting surface 20. The soft foam layer 18 absorbs the force of the collision and, in turn, substantially simultaneously decelerates the cranium and cervical spine. As a result, the apparatus 10 minimizes the risk of the occurrence of whiplash related injuries, because there is little movement of the cervical spine relative to the cranium during the collision.

The frame 16 of the apparatus 10 is formed to define a hollow enclosure 21, as shown in FIG. 3. The foam layer 18 can, therefore, be molded directly onto the frame 16 in a manner known to those skilled in the art, such as by reaction injection molding. The bottom portion of the frame 16 is welded to the horizontal bar 15 and support legs 14 at several weld locations, indicated typically by the reference numeral 23 in FIG. 1. The apparatus 10 is vertically adjustable by moving the support legs 14 up or down, so that the surface 20 corresponds to the posterior contour of the passenger's cranium and cervical spine, as shown in FIG. 3.

The dimensions of the surface 20 are based on dimensions of the craniums and cervical spines of typical passengers. Referring to FIG. 3, it has been found that the dimension A, which is the approximate radius of the posterior portion of a passenger's cranium, is about 3 inches. The dimension B, which is the approximate distance from the approximate center line (or center of mass) of a passenger's cranium to the center line of the fifth vertebrae, is about 6 inches.

The surface 20 of the apparatus 10 is shaped and dimensioned to substantially match the contour of a cranium and cervical spine based on these typical passengers, dimensions. Although the apparatus 10 does not exactly match the contour of every passenger's cranium and cervical spine, it substantially matches the contour for most passengers. As a result, it substantially simultaneously decelerates the cranium and cervical spine during a vehicle collision and, accordingly, prevents the occurrence of whiplash related injuries.

The dimensions (in inches) used for constructing the supporting surface 20 to match the posterior contour of a typical passenger's cranium and cervical spine in accordance with the present invention, as shown in FIG. 3, are as follows:

$A = 3.0$ $B = 6.0$ $C = 2\frac{1}{4}$ (radius)

$D = 2.0$ $E = 13/16$ $F = 3\ 7/16$ (radius)

$G = 1\frac{3}{8}$ $H = 45°$ $I = 1\frac{1}{4}$ (radius)

$K = 1\ 7/16$

The dimension C is the radius of the third area 30 of the surface 20 adapted to contact the cervical spine. The dimension D is the distance from the center line of the support legs 14 (the X axis) to the center of the radius C. The dimension F is the radius of the surface 20 where the second area 28 meets the third area 30. The dimension G is the distance from the center line of the horizontal bar 15 (the Y axis) to the center of the radius C. The angle H is the angle of a construction line drawn with respect to the Y axis.

The dimension I is the distance from the construction line drawn along the angle H to a portion of the second area 28 of the surface 20. The dimension J is the blend radius of the portion of the surface 20 where the first area 26 meets the second area 28. And the dimension K is the distance between the center line of the support legs 14 (the X axis), and a portion of the first area 26 of the surface 20.

It should be pointed out that although these dimensions have been found to be appropriate for the embodiment of the apparatus 10 illustrated, they may be varied within the scope of the present invention. For example, if it is determined that the typical dimensions A and B may be different for a group of passengers than as determined above, then the other dimensions of the apparatus 10 will change accordingly. Thus, in accordance with the present invention, the dimensions can be varied by those skilled in the art to ensure that the contour of the surface 20 matches the posterior contour of a typical passenger's cranium and cervical spine In this way, during a vehicle collision, the apparatus 10 can substantially simultaneously decelerate the cranium and cervical spine and, as a result, prevent the occurrence of whiplash related injuries.

In FIGS. 4 through 7, another apparatus embodying the present invention is indicated generally by the reference numeral 110. The apparatus 110 is used as a headrest in a motor vehicle (not shown), and is mounted on a support including a pair of vertical support legs 112 coupled together by a horizontal bar 113. The support legs 112 are supported within a seatback 114 (illustrated schematically in dashed lines in FIG. 5). The support legs 11 are vertically adjustable to adjust the position of the apparatus 110 relative to the cranium and cervical spine of a passenger (as illustrated in broken lines in FIGS. 4 and 6), in a manner known to those skilled in the art.

The apparatus 110 comprises a foam outer layer 116 molded onto a housing 118. The foam layer 116 preferably consists essentially of a urethane foam of a type typically used to make headrests. The foam layer 116 is directly molded onto the housing 118, in a manner known to those skilled in the art, such as by reaction injection molding. The housing 118 is rotatably supported on the horizontal bar 113 and, therefore, is movable in the direction indicated by the arrows in FIG. 4, as described further below.

Figure 4:
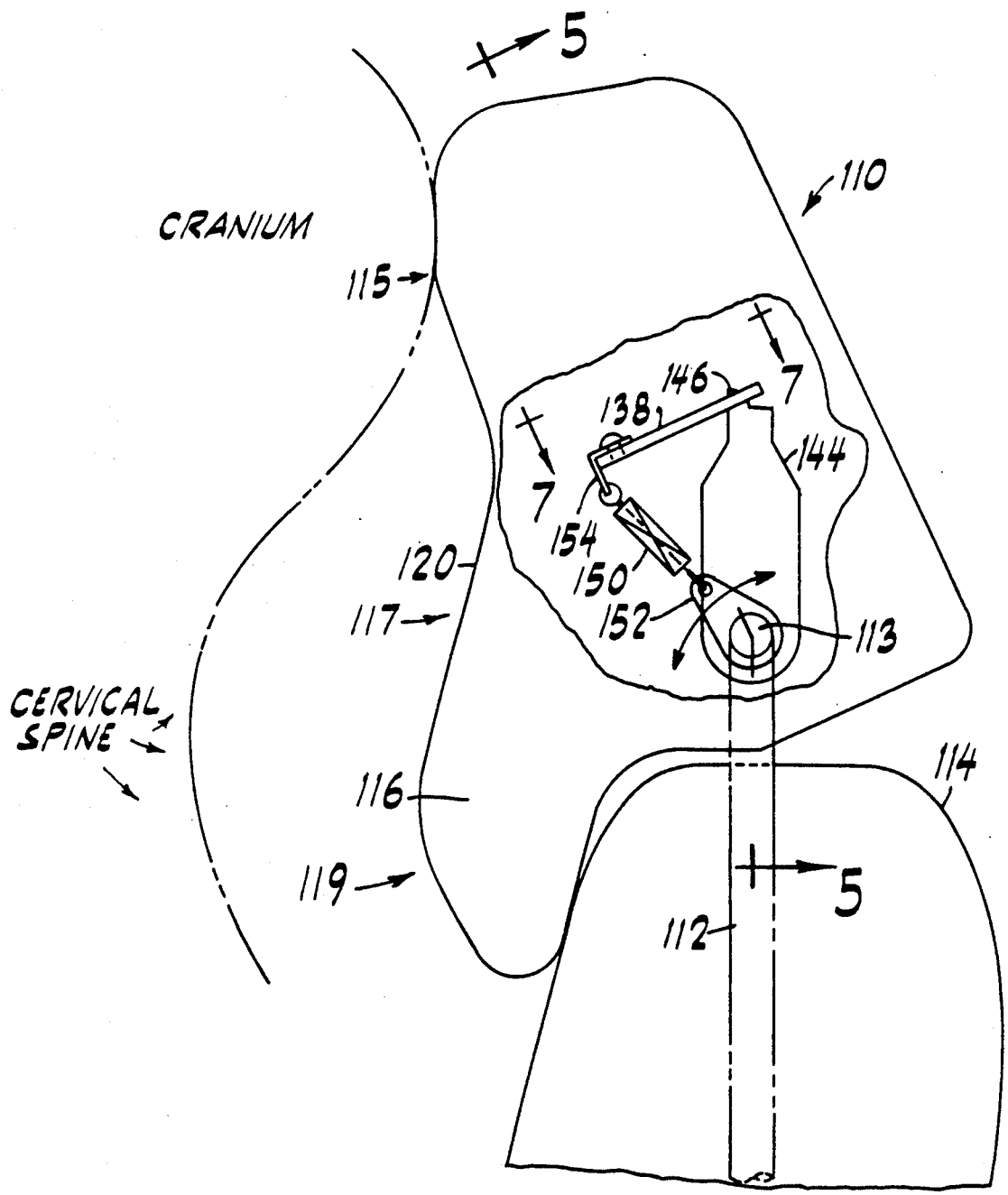
FIG. 4 is a side plan view, illustrated in partial cross-section, of another apparatus for preventing whiplash related injuries embodying the present invention, illustrating the posterior contour of a typical passenger's cranium and cervical spine in broken lines.
Figure 6:
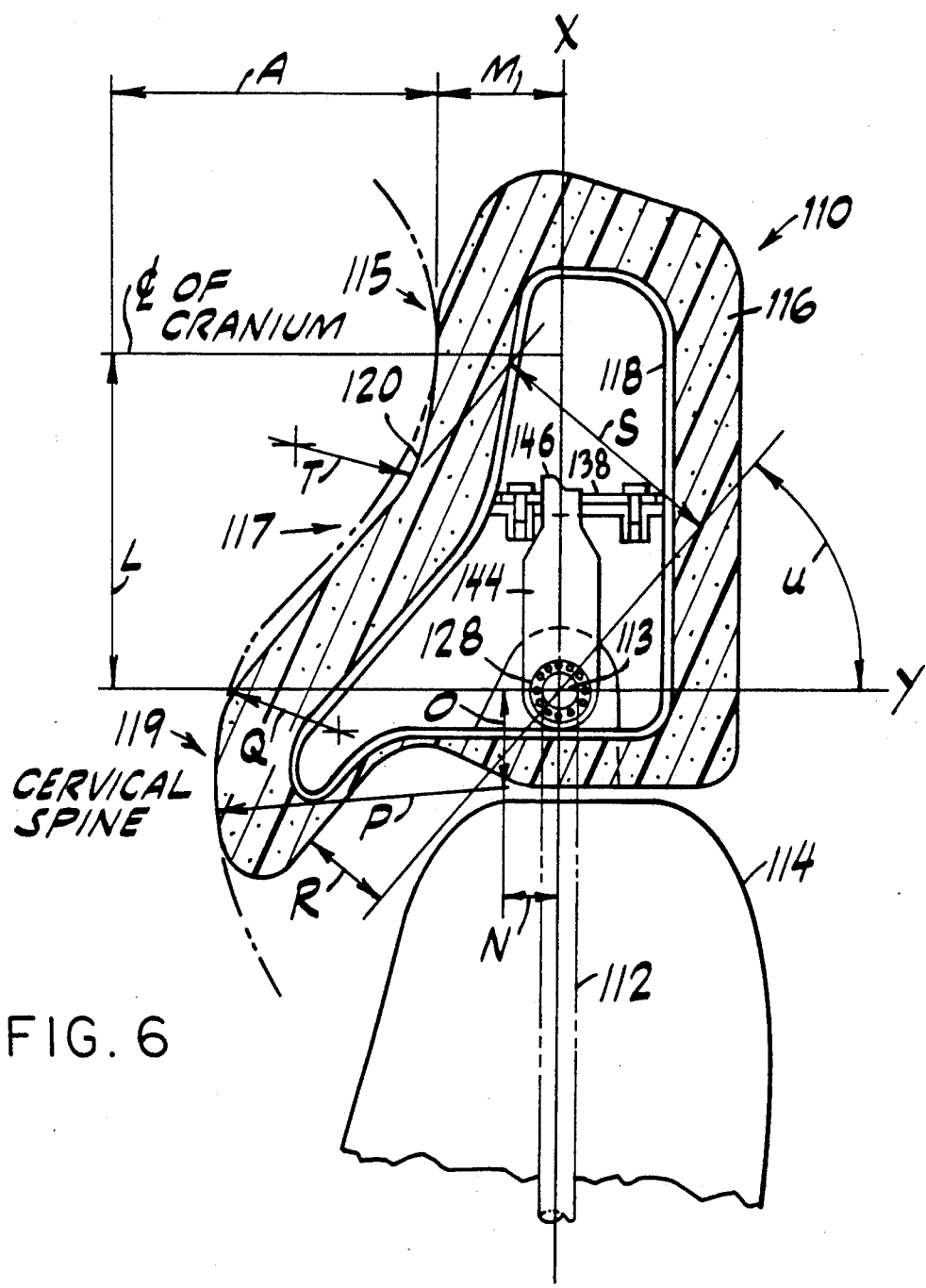
FIG. 6 is a cross-sectional view of the apparatus of FIG. 5, taken along the line 6—6 of FIG. 5, and illustrating the posterior contour of a typical passenger's cranium and cervical spine in broken lines.

The apparatus 110 defines a head and neck supporting surface 120, as illustrated in FIGS. 4 and 6. The supporting surface 120 is shaped to conform to the posterior contour of a typical passenger's cranium and cervical spine, as shown in FIG. 6. The supporting surface 120 includes a first contact area 115, a second contact area 117, and a third contact area 119. As shown in FIGS. 4 and 6, the first contact area 115 is located and shaped to support the approximate central posterior area of the passenger's cranium; the second contact area 117 is located and shaped to support the posterior area approximately where the passenger's cranium meets the cervical spine; and the third contact area 119 is located and shaped to support the posterior area of the passenger's cervical spine.

Accordingly, during a vehicle collision, if the passenger's head is thrown back toward the seatback 114, the first contact area 115, second contact area 117, and third contact area 119 of the surface 120 substantially simultaneously decelerate the cranium and cervical spine, as described further below. As a result, there is minimal movement of the cranium relative to the cervical spine and, accordingly, the occurrence of whiplash related injuries is ordinarily avoided.

Figure 5:
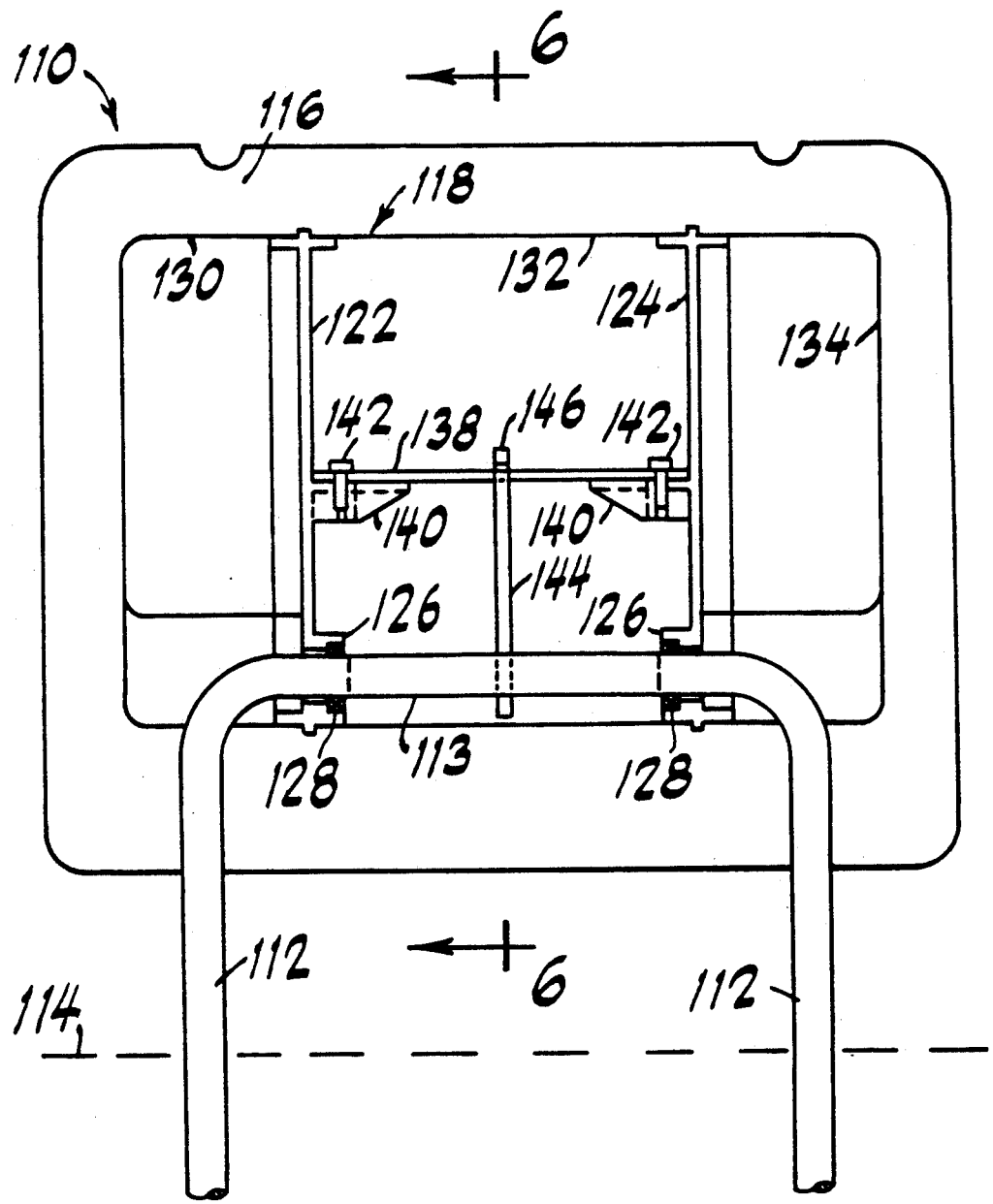
FIG. 5 is a cross-sectional view of the apparatus of FIG. 4 taken along the line 5—5 of FIG. 4.

As shown in FIG. 5, the housing 118 comprises a left frame 122, and a right frame 124. Both the left and right frames are supported by the horizontal bar 113, and project upwardly therefrom in a direction substantially perpendicular thereto. Each of the frames 122 and 124 includes a flange 126, which is journaled to the horizontal bar 113 by sealed radial ball bearings 128. The housing 118 is therefore rotatable relative to the support legs 112, as indicated by the arrows in FIG. 4.

The housing 118 further comprises a left enclosure 130, a center enclosure 132, and a right enclosure 134. The left enclosure 130 and the left side of the center enclosure 132 are coupled to the left frame 122 on either side thereof. The right enclosure 134 and the right side of the center enclosure 132, on the other hand, are coupled to the right frame 134 on either side thereof. The enclosures 130, 132 and 134 are, accordingly, coupled to each other to form the enclosed frame 118. The front face of each of the enclosures 130, 132, and 134 is shaped to support the foam layer 116 and form the support surface 120. The support surface 120 is, accordingly, shaped and dimensioned to correspond to the posterior contour of a typical passenger's cranium and cervical spine, as shown in FIGS. 4 and 6.

A stop plate 138 is coupled to and extends between the left frame 122 and right frame 124. Each of the frames 122 and 124 includes a support shelf 140 for supporting the stop plate 138 thereon. The stop plate 138 is coupled on either end to the support shelves 140 by fasteners 142. A stop 144 is coupled to the center of the horizontal bar 113, preferably by welding, and extends upwardly therefrom in a direction substantially perpendicular to the axial direction thereof, as illustrated in FIGS. 4 through 6. The stop 144 includes a knob 146 extending upwardly from a top surface thereof.

Figure 7:
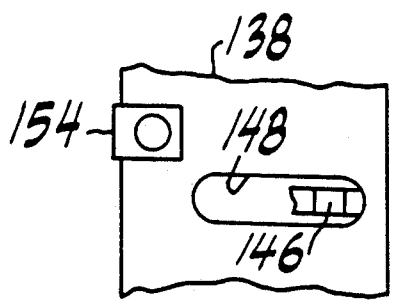
FIG. 7 is a top plan view of a portion of the apparatus of FIG. 4, taken along the line 7—7 of FIG. 4.

As shown in FIG. 7, the knob 146 is dimensioned to be received within an elongated aperture 148, extending through the center portion of the stop plate 138. The aperture 148 is dimensioned so that when the apparatus 110 is rotated back toward the seatback 114, the front wall of the aperture 148 engages the knob 146 and, thus, maintains the apparatus 110 in an upright position, as shown in FIG. 6. Then, when the apparatus 110 is permitted to rotate toward the front of the seatback 114, the knob 146 slides through the elongated aperture 148. The knob 146, in turn, engages the back wall of the aperture 148 and, accordingly, maintains the apparatus 110 in a downwardly rotated position, as shown in FIG. 4.

An extension spring 150 is coupled between the front of the stop plate 138, and the horizontal bar 113. A slip ring 152 is fitted on one end over the horizontal bar 113, and coupled on the other end to the extension spring 150. The other end of the extension spring 150 is coupled to the front end of the stop plate 138 by a fastener 154. The slip ring 152 is rotatable relative to the horizontal bar 113 and, therefore, permits the extension spring 150 and stop plate 138 to rotate relative to the stop 144. The extension spring 150 normally biases the stop plate 138 in the forward position against the knob 146, as shown in FIG. 4. Therefore, the apparatus 110 is normally maintained in a forward rotated position so that the first area 115 of the support surface 120 is maintained in contact with, or in close proximity to, the posterior portion of the passenger's cranium, as shown in FIG. 4.

However, in the event of a collision, if the passenger's head is thrown back toward the seatback 114, the cranium initially contacts the first area 115 of the support surface 120 and, in turn, causes the apparatus 110 to rotate in the direction back toward the seatback 114. As a result, the second area 117 and third area 119 of the support surface 120 are each rotated into engagement with the respective posterior port ions of the cranium and cervical spine, as shown in FIG. 6. Thus, when both the posterior portions of the cranium and cervical spine engage the support surface 120, the surface 120 substantially simultaneously decelerates both portions of the body. As a result, the occurrence of whiplash related injuries is ordinarily avoided. Then, once the passenger's head moves back toward the front of the vehicle and away from the seatback 114, the extension spring 150 causes the apparatus 110 to rotate toward the front of the seatback 114, and thus follow the passenger's head.

The dimensions of the support surface 120 of the apparatus 110 are determined in the same way as the dimensions of the support surface 20 described above in relation to FIGS. 1 through 3. Accordingly, the dimensions (in inches) used for constructing the support surface 120 to match the posterior contour of a typical passenger's cranium and cervical spine, in accordance with the present invention, are as follows:

$A = 3.0$ $L = 4\frac{7}{8}$ $M = 1\ 9/16$ $N = \frac{7}{8}$ $O = 1\frac{1}{8}$ $P = 3\ 13/16$ $Q = 1\frac{1}{4}$ (radius)

$R = 1\frac{1}{4}$ $S = 3\ 3/16$ $T = 1\frac{1}{4}$ (radius)

$U = 50°$

The dimension A, as described above, is the approximate radius of the posterior contour of a passenger's cranium. The dimension L is the vertical distance between the Y axis (intersecting the center line of the horizontal bar 113), add the approximate center line of a passenger's cranium. The dimension M is the distance between the center line of the support legs 112 (the X axis), and the first area 115 of the surface 120. The dimension N is the distance between the center line of the horizontal legs 112 (the X axis), and the center of the radius P. The dimension O is the distance between the Y axis and the center of the radius P. The dimension P is the radius of the lower portion of the third area 119 of the surface 120. The dimension Q is the blend radius of the lower portion of the surface 120 where the second area 117 meets the third area 119.

The dimension R is the distance between a construction line drawn along the angle U, and the portion of the under surface of the apparatus 110 facing the seatback 114. The dimension S is the distance between a construction line drawn along the angle U, and a portion of the second area 117 of the support surface 120. The dimension T is the blend radius of the portion of the surface 120 where the first area 115 meets the second area 117. And the angle U is the angle of the construction line drawn parallel to a portion of the second area 117 of the surface 120, as shown in FIG. 6, with respect to the Y axis.

It should be pointed out that although these dimensions have been found to be appropriate for the embodiment of the present invention illustrated, they may be varied within the scope of the present invention. For example, the typical dimensions of the posterior contour of the cranium and cervical spine may be different for a particular group of passengers. Thus, in accordance with the present invention, these dimensions can be varied to ensure that the contour of the surface 120 matches the posterior contour of each passenger's cranium and cervical spine. Therefore, during a vehicle collision, the apparatus 110 can substantially simultaneously decelerate the cranium and cervical spine and, as a result, prevent the occurrence of whiplash related injuries.

Thus, one advantage of the apparatus of the present invention, is that during a rear-end collision, the supporting surface simultaneously decelerates the cranium and cervical spine, because it is located and shaped to match the general contour thereof. As a result, there is substantially no movement of the cranium relative to the cervical spine, as with known seatbacks and/or headrests. The occurrence of whiplash related injuries caused by damaging the cervical spine is, accordingly, ordinarily avoided.

Another advantage of the apparatus of the present invention, is that the first contact area of the supporting surface extends upwardly beyond the approximate central posterior area (or center of mass) of the passenger's cranium, as shown in FIGS. 3 and 6. As a result, when the passenger's cranium strikes the first contact area during a collision, it is typically not permitted to slide upwardly over the top edge of the apparatus. Accordingly, vertebral damage typically associated with known seatbacks and/or headrests caused by stretching the cranium upwardly relative to the vertical spine, is avoided.

We claim:

1. An apparatus for preventing whiplash related injuries to a passenger in a vehicle, comprising:
    a frame supported on a seat of the vehicle and located behind the cranium and cervical spine of a passenger on the seat;
    a layer of resilient material supported on the frame, the layer of resilient material defining a supporting surface located behind the cranium and cervical spine of the passenger and defining a contour that corresponds to the posterior contour of the passenger's cranium and cervical spine, wherein the supporting surface defines a first area located to contact and support the approximate central posterior area of the passenger's cranium, a second area located below the first area to contact and support the posterior area approximately where the passenger's cranium meets the cervical spine, and a third area located below the second area to contact and support the posterior area of the passenger's cervical spine, the first, second and third areas each contacting the respective areas of the passenger's cranium and cervical spine to substantially simultaneously decelerate those areas during a vehicle collision and prevent whiplash related injuries;
    a support member coupled to the frame and supported on the seat, the support member being vertically moveable relative to the seat to adjust the position of the apparatus relative to the passenger and align the position of the supporting surface with the posterior contour of the passenger's cranium and cervical spine, the frame being journaled to the support member and normally biased toward the front of the seat, whereupon during a vehicle collision, when the passenger's head is forced toward the supporting surface, the posterior portion of the passenger's cranium initially contacts the first area of the supporting surface and rotates the frame relative to the support member toward the back of the seat and, in turn, rotates the second and third areas of the supporting surface into contact with the posterior portion of the passenger's lower cranium and cervical spine; and wherein
    the support member includes two support legs and a bar extending therebetween, the two support legs being oriented substantially parallel relative to each other and supported on the seat, and the frame is journaled to the bar;
    a stop member coupled to the bar and projecting upwardly therefrom;
    a stop plate coupled to the frame and moveable relative to the stop member; and
    a spring coupled between the stop plate and the bar, wherein the spring biases the stop plate to slide relative to the stop member toward the front of the seat and, thus, biases the stop plate and frame toward the passenger's head.

2. An apparatus as defined in claim 1, wherein
    the stop plate defines an elongated aperture extending therethrough and adapted to receive the stop member therein, the elongated aperture permitting the stop plate to slide toward the front of the seat until a back wall defining the aperture engages the stop member to orient the apparatus in a downwardly rotated position, the elongated aperture further permitting the stop plate to slide toward the rear of the seat until a front wall defining the aperture abuts the stop member to orient the apparatus in an upright position.

3. An apparatus for preventing whiplash-related injuries to a passenger in a vehicle, comprising:
    a frame supported on a seat of the vehicle and located behind the cranium and cervical spine of a passenger on the seat; and
    a layer of resilient material supported on the frame, the layer of resilient material defining a supporting surface located behind the cranium and cervical spine of the passenger and defining a contour that corresponds to the posterior contour of the passenger's cranium and cervical spine, and including a first surface located behind a passenger's cranium and projecting upwardly above the approximate center of mass of the passenger's cranium and including a substantially flat portion for contacting and supporting the approximate central posterior area of the passenger's cranium and a second surface located below the first surface and defining a substantially convex curve projecting anteriorly relative to the first surface a sufficient distance to contact and support the posterior portion of the passenger's cervical spine substantially simultaneously with the said contact of the passenger'cranium with said first surface, thereby substantially simultaneously decelerating the cranium and cervical spine during a vehicle collision to prevent whiplash-related injuries to the passenger; said second surface being joined to said first surface by a flattened area which is smoothly joined to said first and second surfaces, said flattened area extending anteriorly at an obtuse angle from said first surface and being located to support the passenger's posterior area approximately where the cranium meets the cervical spine; said second surface including a convexly radiused portion the center of curvature of which is anterior of said first surface whereby said second surface is sufficiently anterior of said flattened area to enable said contact substantially simultaneously with said contact of the passenger's cranium with said first surface, and with the contact of the flattened area with said passenger's posterior area approximately where the cranium meets the cervical spine.

4. An apparatus in accordance with claim 3 for supporting a passenger's cranium and cervical spine seated in a vehicle, further comprising;
    a support member supported within a seat in the vehicle and adjustable relative to the passenger's cranium and cervical spine; and
    a housing coupled to the support member and including said layer of resilient material for supporting a passenger's cranium and cervical spine when moved into contact therewith.

5. An apparatus as defined in claim 4, wherein
    the housing is rotatable relative to the support member and includes means for biasing the apparatus in a downwardly rotated first position toward the passenger, whereupon during a vehicle collision, when the passenger's head is moved into contact with the apparatus, the housing is rotated into an upright second position to permit the support surface to contact and support the posterior portion of the passenger's cranium and cervical spine.

6. An apparatus as defined in claim 3, further comprising:
    a support member coupled to the frame and supported on the seat, the support member being vertically moveable relative to the seat to adjust the position of the apparatus relative to the passenger and align the position of the supporting surface with the posterior contour of the passenger's cranium and cervical spine.

7. An apparatus as defined in claim 6, wherein
    the frame defines a hollow enclosure and the layer of resilient material consists essentially of a urethane foam which is molded thereon.

8. An apparatus as defined in claim 6, wherein
    the frame is journaled to the support member and normally biased toward the front of the seat, whereupon during a vehicle collision, when the passenger's head is forced toward the apparatus, the posterior portion of the passenger's cranium initially contacts the first surface of the supporting surface and rotates the frame relative to the support member toward the back of the seat and, in turn, rotates the second and third surfaces of the supporting surface into contact with the posterior portion of the passenger's lower cranium and cervical spine.

* * * * *